July 23, 1935.    L. C. EDGAR ET AL    2,009,251
METHOD FOR HANDLING FURNACE FLUE DUST
Filed June 30, 1931    3 Sheets-Sheet 3
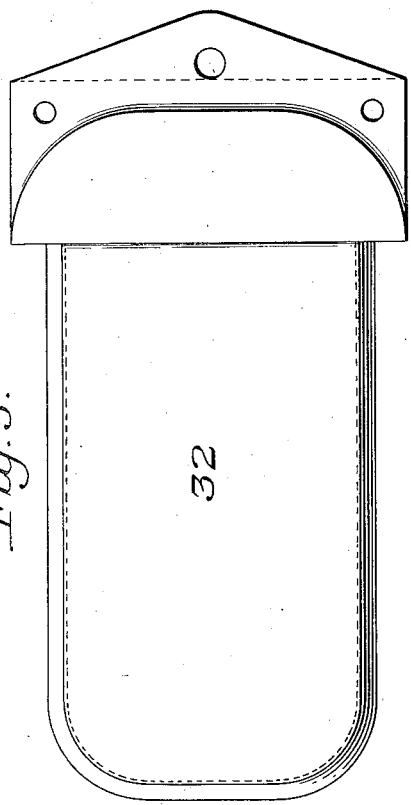
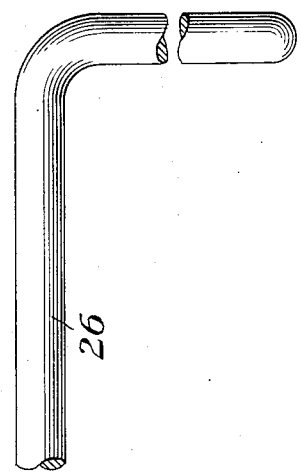
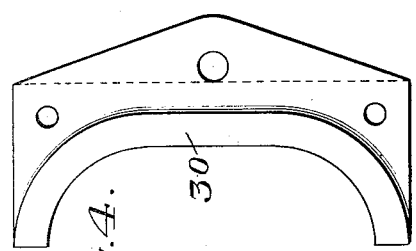
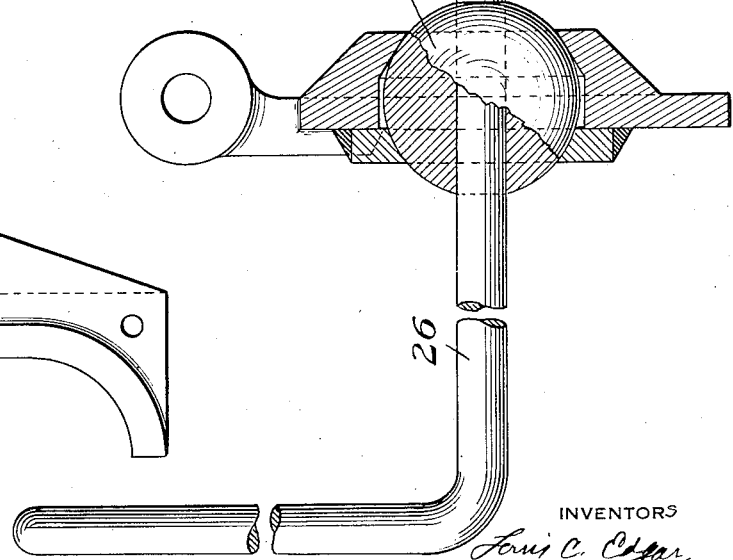

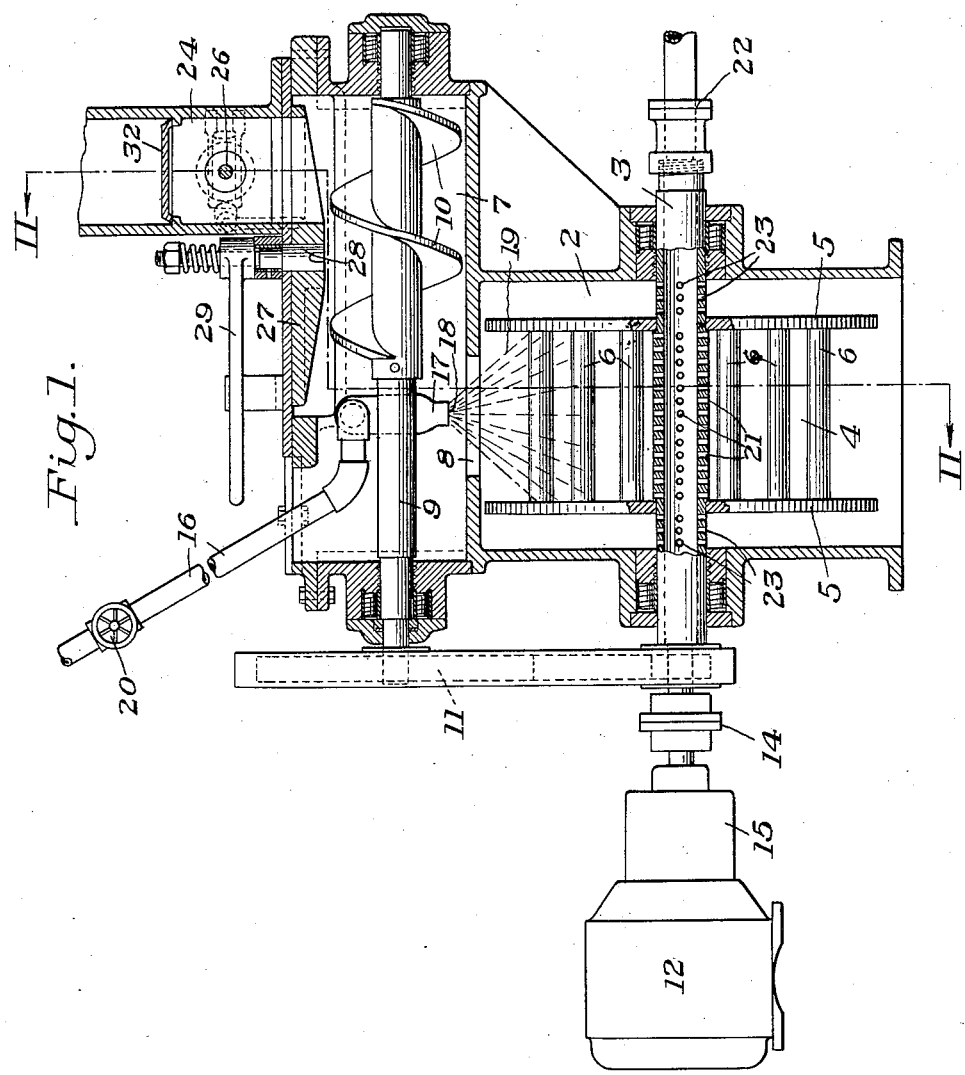

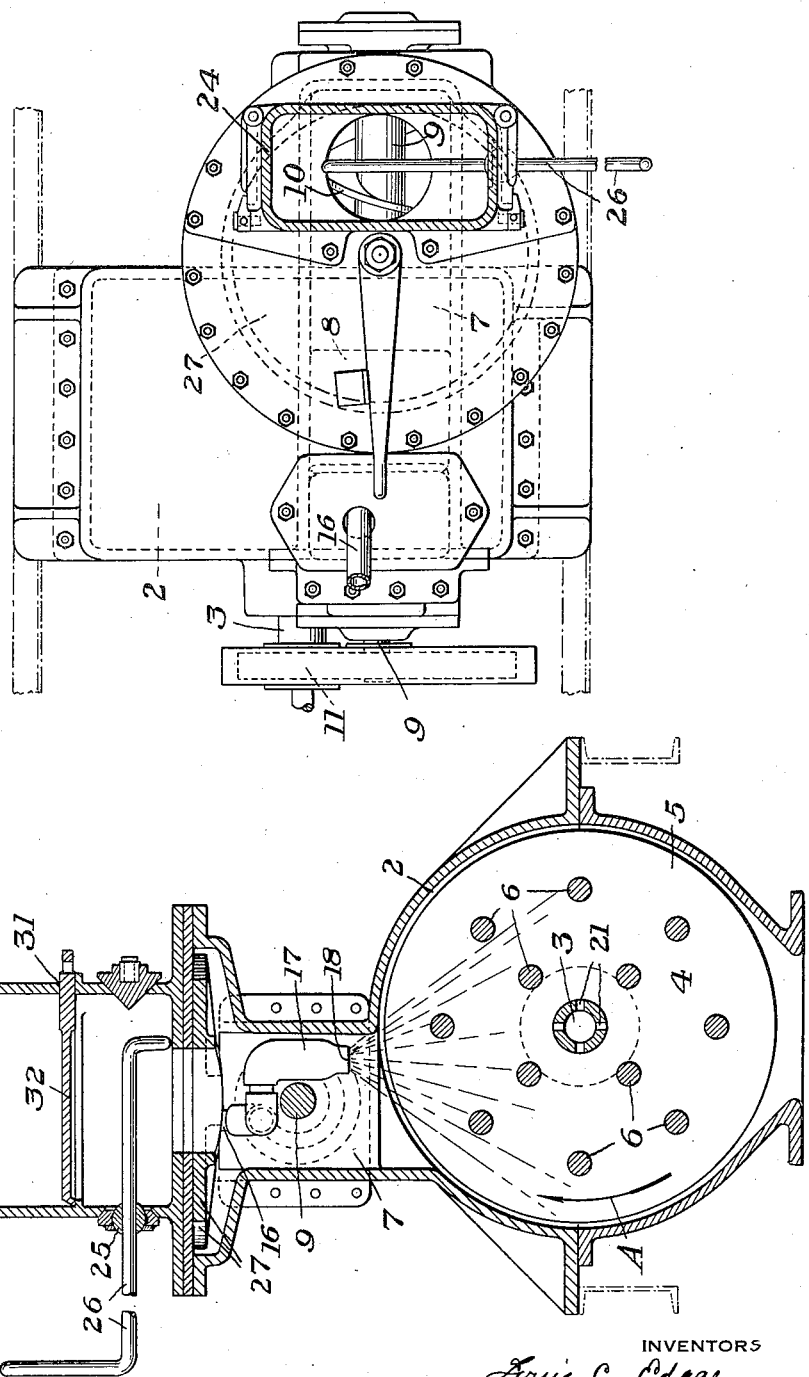

Patented July 23, 1935

2,009,251

UNITED STATES PATENT OFFICE 2,009,251

METHOD FOR HANDLING FURNACE FLUE DUST

Louis C. Edgar, Swissvale, and Edgar E. Brosius, Pittsburgh, Pa.; said Edgar assignor to said Brosius Application June 30, 1931, Serial No. 547,894

3 Claims. (Cl. 259—25)

The present invention relates to a method and apparatus for the treatment of flue dust, and especially flue dust as delivered from a blast furnace or the like.

At the present time, in the operation of blast furnaces, flue dust is formed in large quantities. Due to the ore content of such flue dust, it is desirable to effect a recovery thereof. In view of the finely pulverized condition in which the flue dust exists, as well as the high temperature at which it is removed from the furnace, the handling thereof involves considerable difficulty. Any handling process to be effective, must be capable of not only destroying, or to a large extent at least removing the contained heat, but of effecting such heat removal under conditions such that dissemination or scattering of the flue dust is prevented.

It has heretofore been proposed in the art to which the present invention relates to treat flue dust by delivering the same, for example, from a suitable gas cleaner to a pug mill wherein water was added simultaneously with the agitation of the material. Experience has shown, however, that the flue dust is water repellant. We believe that this condition is due not only to the temperature of the flue dust, but also possibly to the fact that it is positively charged with electricity under such conditions that there exists electrical repulsion between the material and the water. In any case, we have found that it is impossible by the mere act of agitation to effect a thorough and uniform intermixing of water and flue dust. We have further found that the ability to effect such a mixture, and therefore uniform conditioning of the flue dust is dependent, at least to a large extent, upon the amount of work performed on the dust either prior to or simultaneously with the addition of water.

We have also found that the most desirable conditions are obtained where the work performed is of such character as to maintain the flue dust in a condition of suspension during the time at which the water is added, whereby the water in finely divided particles contacts with the flue dust which is also finely divided and held in suspension. In this manner each particle of flue dust, while substantially out of intimate contact with other particles, is subjected to a water absorption or adsorption of such nature that the heat therein is destroyed and the particle of dust moistened to the desired extent. Thereafter the individually moistened particles may be collected and conveyed to any desired point for subsequent use, treatment or disposal.

In accordance with this invention, it is contemplated that one such method of disposal may comprise a sintering operation, the moisture content of the flue dust being such that its fluid flow characteristics are destroyed and the desired degree of cohesion imparted thereto such that the flue dust may be readily maintained in position on the sintering grates.

It is therefore one of the objects of the present invention to provide a method and apparatus for the handling of materials of the character referred to, and more especially to flue dust, effective for performing the desired amount of work on the flue dust to make it susceptible to the action of water, and to supply water thereto while the flue dust is maintained in such condition of susceptibility.

In the accompanying drawings we have shown for purposes of illustration, a preferred embodiment of the present invention. In the drawings—

Figure 1 is a vertical sectional view through one form of apparatus constructed in accordance with the present invention, certain of the parts being illustrated in elevation;

Figure 2 is a vertical sectional view on the line II—II of Figure 1;

Figure 3 is a view partly in plan, and partly in section, of the apparatus illustrated in Figure 1, the portion in section being along the line III—III of Figure 1, looking in the direction of the arrows;

Figure 4 is a detail plan view, of the throat plate utilized in accordance with the present invention;

Figure 5 is a similar view of the throat gate adapted to be substituted for the throat plate under conditions as hereinafter described; and Figure 6 is a detail view on an enlarged scale of the poker rod and poker mounting.

In accordance with the present invention, there is provided a treating apparatus comprising a moistening, cooling and agitating or work chamber 2 of any desired shape and size through which extends a shaft 3 carrying a beater or agitator 4. This beater is herein illustrated as comprising a pair of side plates 5 in spaced parallel relationship secured to the shaft 3, and having mounted therebetween a series of beating and agitating rods 6, any desired number of which may be provided.

Mounted above the chamber 2, and preferably offset with respect to the axis of rotation of the agitator, as illustrated more particularly in Figure 2, is a feeding and measuring chamber 7 communicating with the chamber 2 through a relatively restricted opening 8 for insuring the delivery of material from the chamber 7 to the chamber 2 in the plane of rotation of the agitator 4. To this end the opening 8 is preferably of less effective width than the distance between the side plates 5.

Journaled in the chamber 7 is a shaft 9 carrying a conveying and measuring screw 10. Inasmuch as the amount of work performed on the material undergoing treatment should be substantially constant for a given quantity of such material, it is desirable to maintain at all times a predetermined speed relationship between the conveyor 10, constituting the measuring unit for the material delivered to the agitator, and the agitator itself. This may conveniently be accomplished by providing the shaft 9 with a drive connection 11 from the shaft 3, the drive being herein illustrated as comprising a link belt roller drive. The shaft 3 is in turn driven at any desired speed by a motor 12 herein illustrated as operatively connected thereto by a flexible coupling 14 through a speed reducer 15.

The motor 12 may be either a constant speed motor, under conditions wherein it is desired at all times to insure a constant predetermined rate of feed, or may be a variable speed motor under conditions wherein it is desired to vary the rate of feed in accordance with the quantity of material to be treated. With such a construction, if the speed of the motor is increased, to thereby increase the rate of delivery of the material, it will be noted that the speed of the agitator is likewise increased in direct proportion, thereby maintaining at all times a condition of operation such that the quantity of work per unit of material undergoing treatment is substantially constant.

By reference to Figure 2, it will be noted that the agitator is rotated in the direction of the arrow A, thereby subjecting the material falling through the opening 8 to a beating or agitating action in opposition to its gravity flow. This operation tends to maintain the material in finely divided suspended form within the chamber 2 and substantially uniformly distributed throughout the treatment zone therein, this zone comprising, principally, the space between the plates 5.

Extending into and partly through the feeding chamber 7 is a water pipe 16 terminating in a spray head or nozzle 17 preferably having its outlet 18 disposed on the median line between the plates 5, whereby the spray 19 delivered from such head will be substantially symmetrically distributed on opposite sides of such line. In this manner a uniform water quantity throughout the entire treatment zone between the plates 5 is insured, thus subjecting the uniformly distributed material within such zone to a uniform water action.

In order to afford an opportunity for varying the water quantity in exact proportion to the quantity of material undergoing treatment, or other moisture content which it is desired to impart thereto, or to the degree of heat abstraction which it is desired to effect, the pipe 16 is conveniently provided with a control valve 20, affording ready means for such regulation.

While the fluid delivered through the pipe 16 may be obtained from any suitable source, we have found that desirable results are obtained by utilizing so-called sludge water such as obtained, for example, from a Dorr thickener. At the present time it is necessary to subject such sludge water to a filtering operation in order to effect a separation of the water content thereof. In accordance with the present invention, such a filtering operation may be entirely dispensed with, inasmuch as the solid content of the sludge water may be advantageously mixed with the material undergoing treatment in the chamber 2 and the entire mixture thereby uniformly conditioned.

Although the use of a spray head of the character described gives an advantageous water distribution, we have found that we may, if desired, supply the water for treatment purposes by providing the shaft 3 with a series of uniformly arranged perforations 21, treatment water being delivered to the shaft through a suitable connection 22. Such a construction, however, does not lend itself satisfactorily to the handling of fluids containing an appreciable solid content, inasmuch as such solids tend, by reason of centrifugal force set up by the rotation of the agitator, to pack the inside of the shaft. With clean water, however, such a system of water supply may be utilized, the uniform arrangement of the openings, and the uniform head of water thereon, insuring uniformity of treatment of the material within the chamber 2.

Where such a construction is utilized, we preferably extend the perforations beyond the sides of the plates 5 to insure treatment of any particles within the side zones of the chamber. While all of the perforations may be of the same size, it may be desirable in certain cases to make the perforations 23 which are outside of the plates 5, of slightly smaller size in order to correspondingly restrict the water flow therethrough and make it more nearly proportionate to the quantity of flue dust in the side zones.

Carried by the chamber 7 is a delivery throat or hopper 24 adapted to receive material from any desired source. In case of flue dust, this source may comprise a so-called dry gas cleaner, dust catcher or the like, the source of the material constituting no limitation of the present invention. To preclude bridging of the material within the throat 24, we preferably provide means therein for poking or agitating the same, such means being illustrated in detail in Figure 6 as comprising a ball mounting 25 through which extends a poker 26. This construction permits the poker to be axially moved within its mounting or to be universally moved in any direction for obtaining the desired action on the material within the throat.

For controlling the flow of material from the throat 24 into the chamber 7, there may be provided a suitable valve 27 having a rotatable mounting 28 and operated by a suitable handle 29. By means of this construction, the quantity of material delivered per unit of time to the chamber 7 may be varied at the will of the operator while maintaining a constant speed of operation of the measuring device and of the agitator. In this manner, with materials which are found to be more highly water repellant than others, or with materials having a higher heat content, the quantity fed may, if desired, be reduced to thereby insure the performance thereon of a greater quantity of work for obtaining a more intimate mixing of the supplied water.

During the normal operation of the apparatus herein described, at which time it is desired to permit a relatively free flow of material through the throat 24, there is utilized in said throat a throat plate 30 as illustrated in detail in Figure 4, the throat plate serving to close a side opening 31 in the throat 24 without obstructing the downward flow of material therethrough. When, however, it is desired to repair or clean the apparatus, the throat plate 30 may be removed, and a throat gate 32 illustrated in Figure 5 substituted therefor. In Figure 2 of the drawings the throat plate is illustrated as in position across the throat 24 for preventing the passage of material downwardly therethrough. This construction provides advantageous means for cutting off communication between the throat 24 and the remainder of the apparatus, whereby the remaining parts of the apparatus may be bodily removed or subjected to any other desired cleaning or repairing operation.

While we have herein illustrated and described certain preferred embodiments of the present invention, it will be understood that changes in the construction, relationship and operation of the parts may be made without departing either from the spirit of our invention or the scope of our claims.

We claim:

1. The method of handling hot blast furnace flue dust, which comprises separating the flue dust from the hot blast furnace gases, then feeding the collected dust to a closed agitating chamber and there throwing it into a dust-like gaseous suspension and performing mechanical work on the thus-suspended flue dust while it remains in suspension to an extent sufficient to destroy its water-repellant properties while spraying the thus-suspended dust with water and until its water repellant properties are destroyed.

2. The method of handling hot blast furnace flue dust, which comprises separating the flue dust from the hot blast furnace gases, then feeding the collected dust to an agitating chamber and there subjecting it to violent agitation to bring it into a dust-like gaseous suspension, and spraying water through the flue dust while so suspended and until the suspended particles become sufficiently heavy and wet to drop out of suspension.

3. The method of handling furnace flue dust, which comprises separating the flue dust from the furnace gases, then feeding the collected flue dust to an agitating chamber and there throwing it into a dust-like gaseous suspension, spraying water through the suspension, and violently beating the suspension while subjected to the water spray so as to destroy the water repellant properties of the flue dust particles and cause them to be wetted and fall from the suspension.

LOUIS C. EDGAR.
EDGAR E. BROSIUS.